US007978335B2

(12) United States Patent
Inoue

(10) Patent No.: US 7,978,335 B2
(45) Date of Patent: Jul. 12, 2011

(54) SYSTEM FOR PRODUCING TOMOGRAPHIC IMAGE BY OPTICAL TOMOGRAPHY

(75) Inventor: Toshiyuki Inoue, Saitama (JP)

(73) Assignees: FUJIFILM Corporation, Tokyo (JP); Fujinon Corporation, Saitama-shi (JP)

( * ) Notice: Subject to any disclaimer, the term of this patent is extended or adjusted under 35 U.S.C. 154(b) by 373 days.

(21) Appl. No.: 12/349,115

(22) Filed: Jan. 6, 2009

(65) Prior Publication Data
US 2009/0174886 A1  Jul. 9, 2009

(30) Foreign Application Priority Data

Jan. 8, 2008   (JP) .................................. 2008-001079

(51) Int. Cl.
*G01B 9/02* (2006.01)
(52) U.S. Cl. ...................................................... 356/479
(58) Field of Classification Search .................. 356/479, 356/497; 250/227.19, 227.27
See application file for complete search history.

(56) References Cited

U.S. PATENT DOCUMENTS

| 7,372,575 B2* | 5/2008 | Fujita ............................ 356/479 |
| 7,864,335 B2* | 1/2011 | Terakawa et al. ............. 356/497 |
| 2009/0135429 A1* | 5/2009 | Masuda ........................ 356/477 |
| 2009/0168071 A1* | 7/2009 | Teramura et al. ............. 356/496 |

FOREIGN PATENT DOCUMENTS

| JP | 2001-264246 A | 9/2001 |
| JP | 2006-132996 A | 5/2006 |

* cited by examiner

*Primary Examiner* — Michael A Lyons
(74) *Attorney, Agent, or Firm* — Sughrue Mion, PLLC

(57) ABSTRACT

In optical tomography measurement using light, the wavelength of which is periodically swept, interference light between reflection light and reference light is split into first interference light and second interference light by a light splitting means. The optical path length of the first interference light and that of the second interference light are adjusted by an interference-light optical path length adjustment means so that they become the same. Further, balanced detection is performed on the first interference light and the second interference light by an interference light detection means.

4 Claims, 7 Drawing Sheets

SYSTEM FOR PRODUCING TOMOGRAPHIC IMAGE BY OPTICAL TOMOGRAPHY

BACKGROUND OF THE INVENTION

1. Field of the Invention

The present invention relates to a tomographic image processing method, apparatus and program for producing tomographic images (optical tomographic images) by OCT (Optical Coherence Tomography) measurement and a system for producing optical tomographic images using the method, the apparatus or the program.

2. Description of the Related Art

Conventionally, an optical tomographic image obtainment apparatus utilizing OCT measurement has been used in some cases to obtain tomographic images of tissue in vivo (in living organisms) by optical tomography. The optical tomographic image obtainment apparatus is mainly used to observe the eyegrounds (fundi of eyeballs or ocular fundi), anterior segments of eyeballs and skin of patients. Further, the optical tomographic image obtainment apparatus is used to observe various regions of patients. For example, the optical tomographic image obtainment apparatus is used to observe the walls of arteries using a fiber probe and to observe digestive organs by inserting a fiber probe through a forceps channel of an endoscope. In the optical tomographic image obtainment apparatus, low coherent light that has been output from a light source is divided into measurement light and reference light. Then, a measurement target is irradiated with the measurement light, and reflection light that is reflected from the measurement target or backscattered light is combined with the reference light. Further, an optical tomographic image is obtained based on the intensity of interference light between the reflection light and the reference light.

The OCT measurement can be classified into two types, namely, TD-OCT (Time Domain OCT) measurement and FD-OCT (Fourier Domain OCT) measurement. In the TD-OCT (Time Domain OCT) measurement disclosed in Japanese Unexamined Patent Publication No. 2001-264246, the intensity of interference light is measured while the optical path length of reference light is changed. Accordingly, the distribution of the intensities of reflection light that corresponds to the depth-direction position of a measurement target (hereinafter, referred to as a depth position) is obtained.

Meanwhile, in the FD-OCT (Fourier Domain OCT) measurement, the optical path length of reference light and that of signal light are not changed, and the intensity of interference light is measured for each spectral component of light. Further, a frequency analysis, such as Fourier transformation, is performed on the obtained spectral interference intensity signal by using a computer. Accordingly, the distribution of the intensities of reflection light that corresponds to the depth position is obtained. Since the FD-OCT measurement does not require mechanical scan that is necessary in the TD-OCT measurement, the FD-OCT measurement enables high-speed measurement. Therefore, in recent years, the FD-OCT measurement has drawn considerable attention.

Typical examples of the apparatus for performing FD-OCT (Fourier Domain OCT) measurement are an SD-OCT (Spectral Domain OCT) apparatus and an SS-OCT (Swept Source OCT) apparatus. In the SS-OCT apparatus, laser light, the wavelength of which is temporally swept, is output from a light source unit, and reflection light and reference light are interfered with each other at each wavelength. Further, the temporal waveform of signals corresponding to temporal changes in the frequency of light is measured. Accordingly, spectral interference intensity signals are obtained. Further, Fourier transformation is performed on the spectral interference intensity signals by using a computer to obtain an optical tomographic image (please refer to Japanese Unexamined Patent Publication No. 2006-132996).

In the SS-OCT measurement, a method for improving the S/N ratio is disclosed. In the method, an optical fiber coupler or the like is used, and interference light is split into two so that the light amounts of the split interference light are substantially equal to each other. Further, each of the split interference light is detected by a detector, and a difference between detected signals is detected as an interference signal (balanced detection), as disclosed in Japanese Unexamined Patent Publication No. 2001-264246. According to the method, the interference signal is amplified to twice the value thereof, and same-phase optical noise, other than the interference signals, is cancelled. Hence, the non-interference components are removed, and the S/N ratio is improved.

In the aforementioned TD-OCT measurement disclosed in Japanese Unexamined Patent Publication No. 2001-264246, so-called balanced detection is performed on the interference light to improve the S/N ratio. Further, the balanced detection may be applied to the SS-OCT measurement disclosed in Japanese Unexamined Patent Publication No. 2006-132996. To improve the S/N ratio by the balanced detection, when the interference light is split into two, the interference light must be split in such a manner that the light amounts of the interference light after splitting are substantially equal to each other. Further, it is necessary that the optical path length of one of the split interference light and that of the other split interference light are the same.

However, there are cases in which the two optical path lengths (phase difference) differ from each other. In that case, there is a problem that the S/N ratio drops.

SUMMARY OF THE INVENTION

In view of the foregoing circumstances, it is an object of the present invention to provide a system for producing optical tomographic images that can improve the S/N ratio when balance-detection is performed.

A system for producing a tomographic image by optical tomography according to the present invention is a system for producing a tomographic image by optical tomography, the system comprising:

a light source unit that outputs light, the wavelength of which is periodically swept;

a light division means that divides the light, which has been output from the light source unit, into measurement light and reference light;

a light combination means that combines reflection light that is reflected from a measurement target when the measurement target is irradiated with the measurement light, which has been obtained by dividing the light by the light division means, and the reference light;

a light splitting means that splits interference light obtained by combining the reflection light and the reference light at the light combination means into first interference light and second interference light;

an interference-light optical path length adjustment means that adjusts the optical path length of at least one of the first interference light and the second interference light, which have been obtained by splitting the interference light at the light splitting means, so that the optical path length of the first interference light and that of the second interference light become the same;

an interference light detection means that detects, as an interference signal, a difference between the first interference light and the second interference light, the optical path length of at least one of which has been adjusted at the interference-light optical path length adjustment means; and a tomographic image processing means that produces the tomographic image based on the interference signal detected by the interference light detection means.

Here, the interference-light optical path length adjustment means should adjust the optical path length or lengths so that the optical path length of the first interference light and that of the second interference light become the same. The interference-light optical path length adjustment means may adjust only the optical path length of the first interference light. Alternatively, the interference-light optical path length adjustment means may adjust only the optical path length of the second interference light or both of the optical path length of the first interference light and that of the second interference light.

The interference-light optical path length adjustment means may be configured in any manner as long as the optical path length of the first interference light and/or that of the second interference light can be adjusted. For example, the interference-light optical path length adjustment means may include a collimator lens, a light condensing means and a distance adjustment means. The collimator lens collimates the first interference light and/or the second interference light output from the light splitting means. The light condensing means condenses the first interference light and/or the second interference light, which have been collimated by the collimator lens, to cause the condensed light to enter an optical fiber for outputting the first interference light and/or the second interference light to the interference light detection means. The distance adjustment means adjusts a distance between the light condensing means and the collimator lens, between which the first interference light and/or the second interference light travels as collimated light.

Further, a system for producing a tomographic image by optical tomography according to the present invention may further include a light amount adjustment means that adjusts the first interference light and the second interference light, which have been obtained by splitting the interference light at the light splitting means, at a different attenuation rate for each wavelength band so that the light amount of the first interference light and that of the second interference light become substantially equal to each other. Here, the light amount adjustment means should attenuate the first interference light and the second interference light at different attenuation rates for respective wavelength bands. The light amount adjustment means may be configured in any manner as long as the first interference light and the second interference light are attenuated in such a manner. For example, the light amount adjustment means may include a disk-shaped neutral density filter in which the attenuation rate of light changes along the circumference direction of the filter and a rotational drive means for rotating the neutral density filter. The first interference light and the second interference light split by the light splitting means enter the neutral density filter. Alternatively, the light amount adjustment means may be formed by a diaphragm (aperture).

The system for producing a tomographic image by optical tomography according to the present invention may obtain tomographic images by so-called FD-OCT measurement. Alternatively, the system for producing a tomographic image by optical tomography according to the present invention may obtain tomographic images by so-called TD-OCT measurement.

The system for producing a tomographic image by optical tomography according to the present invention includes:

a light source unit that outputs light while the wavelength of the light is periodically swept;

a light division means that divides the light, which has been output from the light source unit, into measurement light and reference light;

a light combination means that combines reflection light that is reflected from a measurement target when the measurement target is irradiated with the measurement light, which has been obtained by dividing the light by the light division means, and the reference light;

a light splitting means that splits interference light obtained by combining the reflection light and the reference light at the light combination means into first interference light and second interference light;

an interference-light optical path length adjustment means that adjusts the optical path length of at least one of the first interference light and the second interference light, which have been obtained by splitting the interference light at the light splitting means, so that the optical path length of the first interference light and that of the second interference light become the same;

an interference light detection means that detects, as an interference signal, a difference between the first interference light and the second interference light, the optical path length of at least one of which has been adjusted at the interference-light optical path length adjustment means; and a tomographic image processing means that produces the tomographic image based on the interference signal detected by the interference light detection means. Therefore, when the first interference and the second interference light are sent from the light spitting means to the interference light detection means, even if the optical path length of the first interference light and that of the second interference light differ from each other, the interference-light optical path length adjustment means can adjust the optical path length of at least one of the first interference light and the second interference light so that the optical path length of the first interference light and that of the second interference light become the same. Therefore, it is possible to improve the S/N ratio.

Further, the system for producing a tomographic image by optical tomography may further include a light amount adjustment means that adjusts the first interference light and the second interference light, which have been obtained by splitting the interference light at the light splitting means, at a different attenuation rate for each wavelength band so that the light amount of the first interference light and that of the second interference light become substantially equal to each other. In that case, even if the light splitting means cannot split the interference light evenly across the entire wavelength band of the interference light due to its wavelength dependence characteristic, the light amount adjustment means can adjust the light amount of the first interference light and that of the second interference light in such a manner that the light amount of the first interference light and that of the second interference light become substantially equal to each other in each of the wavelength bands. Hence, it is possible to improve the S/N ratio.

DESCRIPTION OF THE PREFERRED EMBODIMENTS

Figure 1:
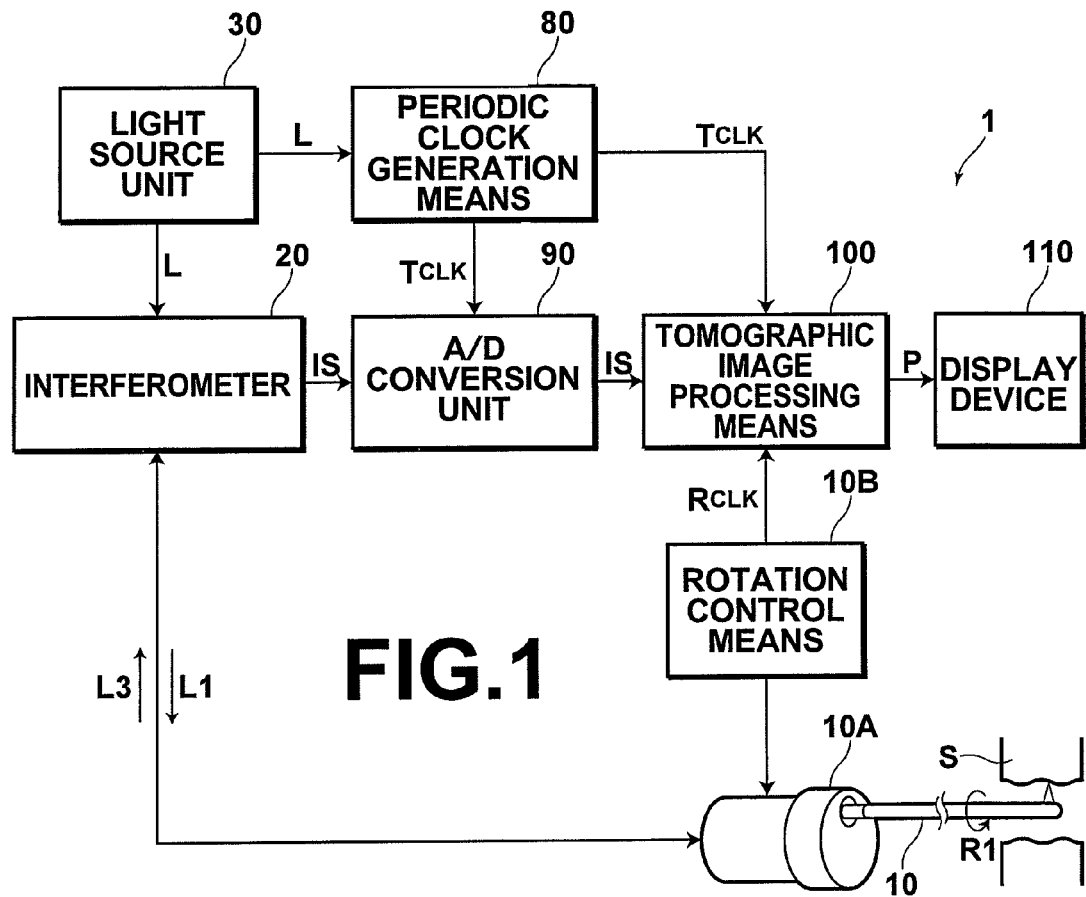
FIG. 1 is a schematic diagram illustrating the configuration of a system for producing tomographic images by optical tomography according to a preferred embodiment of the present invention.

Hereinafter, embodiments of a system for producing tomographic images by optical tomography according to the present invention will be described with reference to drawings. FIG. 1 is a schematic diagram illustrating the configuration of a system for producing tomographic images by optical tomography according to a preferred embodiment of the present invention. A system 1 for producing tomographic images by optical tomography obtains tomographic images of measurement target S, such as tissue or cells in the body cavities of living organisms (in vivo), by SS-OCT (Swept Source OCT) measurement by inserting an optical probe 10 into the body cavities. The system 1 for producing tomographic images by optical tomography includes the optical probe 10, an interferometer 20, a light source unit 30, a periodic clock generation means 80, an A/D (analog to digital) conversion unit 90, a tomographic image processing means 100, a display device 110 and the like.

Figure 2:
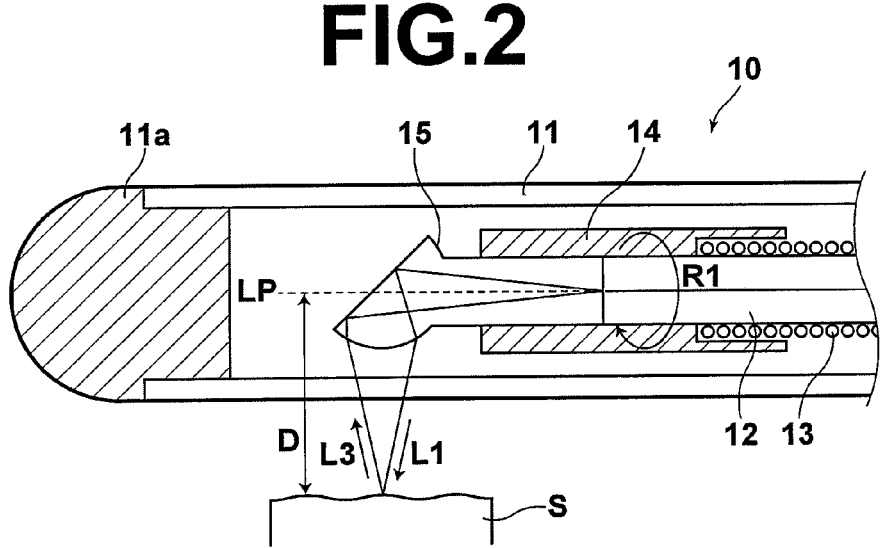
FIG. 2 is a schematic diagram illustrating an example of an optical probe that is used in the system for producing tomographic images by optical tomography illustrated in FIG. 1.

FIG. 2 is a schematic diagram illustrating an example of the tip of the optical probe 10, illustrated in FIG. 1. The optical probe 10 illustrated in FIG. 2 is inserted into the body cavity through a forceps opening, for example. The optical probe 10 includes a probe outer tube (sheath) 11, an optical fiber 12, an optical lens 15 and the like. The probe outer tube 11 is formed by a flexible cylindrical member. The flexible cylindrical member is made of a material that transmits measurement light L1 and reflection light L3. Further, the tip of the probe outer tube 11 is closed by a cap 11a.

The optical fiber 12 guides (directs) the measurement light L1 output from the interferometer 20 to the measurement target S. Further, the optical fiber 12 guides the reflection light (backscattered light) L3 that is reflected from the measurement target S by irradiation with the measurement light L1 to the interferometer 20. The optical fiber 12 is housed in the probe outer tube 11. Further, a spring 13 is fixed onto the outer circumference of the optical fiber 12. The optical fiber 12 and the spring 13 are mechanically connected to a rotational drive unit 10A. The optical fiber 12 and the spring 13 are rotated by the rotational drive unit 10A in the direction of arrow R1 with respect to the probe outer tube 11. Further, a rotation encoder (not illustrated) is provided for the rotational drive unit 10A, and a rotation-control means 10B recognizes, based on a signal output from the rotation encoder, the irradiation position of the measurement light L1.

The optical lens 15 has substantially spherical form to condense the measurement light L1 output from the optical fiber 12 onto the measurement target S. Further, the optical lens 15 condenses the reflection light L3 reflected from the measurement target S and causes the condensed light to enter the optical fiber 12. Here, the focal length of the optical lens 15 is, for example, at a position that is 3 mm (distance D=3 mm) away from the optical axis LP of the optical fiber 12 in the direction of the diameter of the probe outer tube. The optical lens 15 is fixed onto the light output end of the optical fiber 12 by using a fixing member 14. When the optical fiber 12 rotates in the direction of arrow R1, the optical lens 15 rotates in the direction of arrow R1 together with the optical fiber 12. Therefore, the optical probe 10 irradiates the measurement target S with the measurement light L1 output from the optical lens 15 in such a manner to scan the measurement target S in the direction of arrow R1 (the direction of the circumference of the probe outer tube 11).

The operation of the rotational drive unit 10A illustrated in FIG. 1, which rotates the optical fiber 12 and the optical lens 15, is controlled by the rotation control means 10B. The rotation control means 10B controls the operation in such a manner that the optical fiber 12 and the optical lens 15 rotate in the direction of arrow R1 with respect to the probe outer tube 11, for example, at approximately 20 Hz. Further, the rotation control means 10B outputs a rotation clock signal $R_{CLK}$ to the tomographic image processing means 100 when the rotation control means 10B has judged, based on the signal output from the rotation encoder of the rotational drive unit 10A, that the optical fiber 12 has rotated once (one 360-degree turn).

Figure 3:
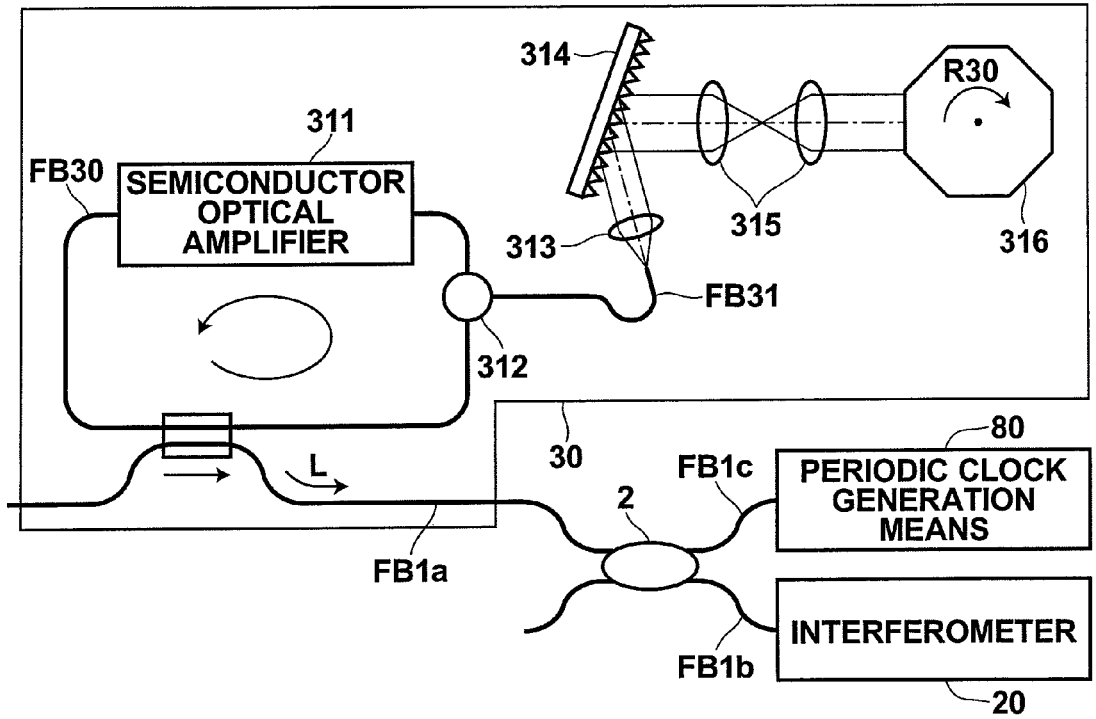
FIG. 3 is a schematic diagram illustrating an example of a light source unit in the system for producing tomographic images by optical tomography illustrated in FIG. 1.

FIG. 3 is a schematic diagram illustrating an example of the light source unit 30. The light source unit 30 outputs laser light L while the wavelength of the laser light L is swept in a constant period $T_0$. Specifically, the light source unit 30 includes a semiconductor optical amplifier (semiconductor gain medium) 311 and an optical fiber FB30. The optical fiber FB30 is connected to both ends of the semiconductor optical amplifier 311. The semiconductor optical amplifier 311 outputs faint light (very weak light) to one of the ends of the optical fiber FB30 when a drive current is injected into the semiconductor optical amplifier 311. Further, the semiconductor optical amplifier 311 amplifies light input thereto from the other end of the optical fiber FB30.

Further, the optical fiber FB30 is connected to an optical splitter 312, and part of the light transmitted through the optical fiber FB30 is output to an optical fiber FB31 through the optical splitter 312. Further, the light is output from the optical fiber FB31 and transmitted to a rotary polygon mirror (polygon mirror) 316 through a collimator lens 313, a diffraction grating element 314 and an optical system 315. Then, the light is reflected from the rotary polygon mirror 316, and reenters the optical fiber FB31 through the optical system 315, the diffraction grating element 314, and the collimator lens 313.

Here, the rotary polygon mirror 316 rotates in the direction of arrow R30, and the angle of each of the reflection planes of the rotary polygon mirror 316 changes with respect to the optical axis of the optical system 315. Accordingly, light only in a specific wavelength band of the light separated by the diffraction grating element 314 returns to the optical fiber FB31. The wavelength of the light that returns to the optical fiber FB31 is determined by the angle between the optical axis of the optical system 315 and each of the reflection planes. The light having the specific wavelength that has entered the optical fiber FB31 enters the optical fiber FB30 through the optical splitter 312. Further, the laser light L that has a specific wavelength is output to an optical fiber FB1a.

Figure 4:
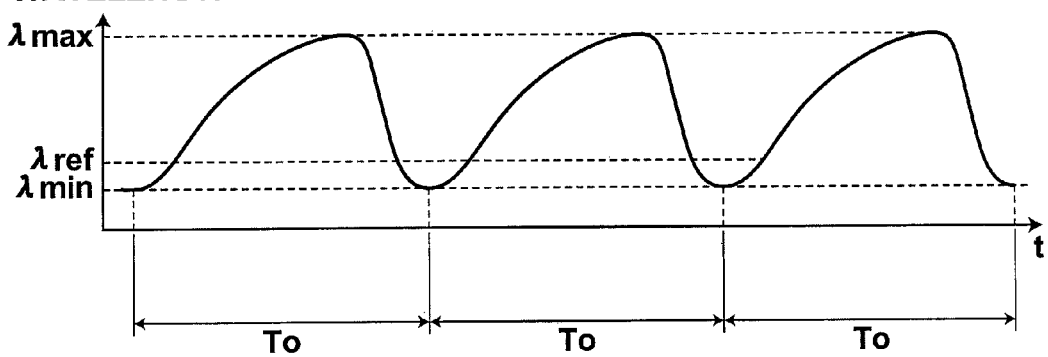
FIG. 4 is a graph showing a manner in which the wavelength of light to be output from the light source unit illustrated in FIG. 3 is swept.

Therefore, when the rotary polygon mirror 316 rotates at constant speed in the direction of arrow R30, the wavelength λ of light that enters the optical fiber FB1a periodically changes as time passes. Specifically, as illustrated in FIG. 4, the light source unit 30 outputs light L, the wavelength of which is swept in a constant period $T_O$ (for example, 50 μsec approximately) from the minimum sweep wavelength λmin to the maximum sweep wavelength λmax. The light L output from the light source unit 30 is split into optical fibers FB1b and FB1c by an optical splitting means 2 constituted of an optical fiber coupler or the like. Further, the light transmitted through the optical fiber FB1b and the light transmitted through the optical fiber FB1c enter the interferometer 20 and the periodic clock generation means 80, respectively.

A case in which the wavelength of light output from the light source unit 30 is swept by rotation of the polygon mirror has been described as an example. Alternatively, light may be output while the wavelength of the light is periodically swept by using a known technique, such as an ASE (amplified spontaneous emission) light source unit.

The periodic clock generation means 80 outputs a periodic clock signal $T_{CLK}$ when the wavelength of light output from the light source unit 30 is swept for one period. For example, the periodic clock generation means 80 detects a state in which the wavelength of the light output from the light source unit 30 becomes a set wavelength and outputs a periodic clock signal $T_{CLK}$. The timing of outputting the periodic clock signal $T_{CLK}$ may be set in various manners as long as the set wavelength is within the swept wavelength band. The periodic clock generation means 80 may set, as the wavelength for outputting the periodic clock signal $T_{CLK}$, a wavelength after completing a sweep or a wavelength immediately after starting a sweep. Alternatively, the periodic clock generation means 80 may set, as the wavelength for outputting the periodic clock signal $T_{CLK}$, a wavelength in the middle of the swept wavelength band. In FIG. 3, a case in which the periodic clock generation means 80 generates the period clock signal $T_{CLK}$ by detecting the light L output from the light source unit 30 has been described, as an example. Alternatively, the periodic clock signal $T_{CLK}$ may be output by detecting the angle of the rotary mirror at the light source unit 30.

Figure 5:
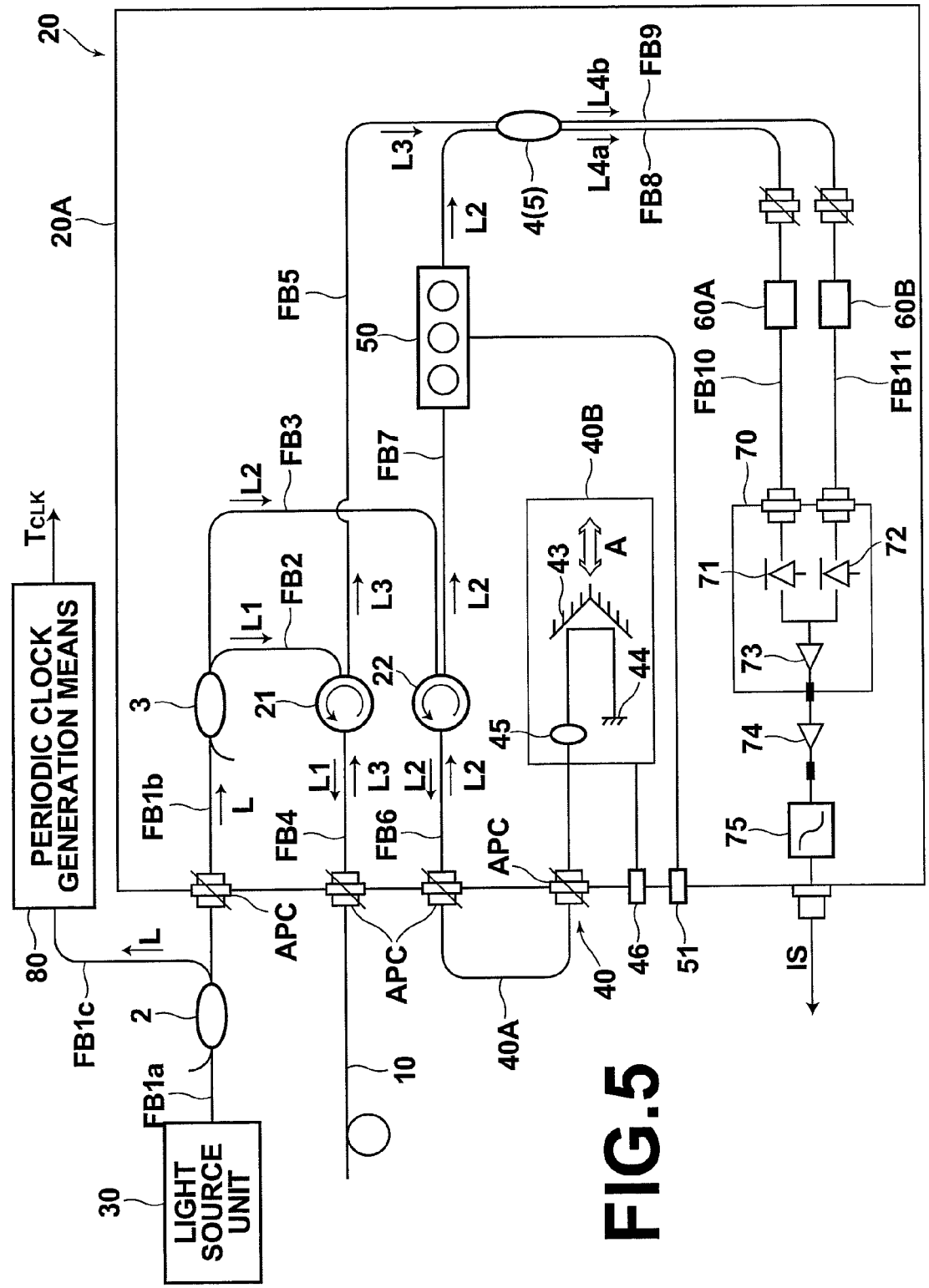
FIG. 5 is a schematic diagram illustrating an example of an interferometer in the system for producing tomographic images by optical tomography illustrated in FIG. 1.

FIG. 5 is a schematic diagram illustrating the configuration of an example of the interferometer 20 in the system 1 for producing tomographic images by optical tomography illustrated in FIG. 1. The interferometer 20 is a Mach-Zehnder interferometer, and includes various optical parts that are housed in a case 20A. The interferometer 20 includes a light division means 3, a light combination means 4, and an interference light detection means 70. The light division means 3 divides the light L output from the light source unit 30 into the measurement light L1 and the reference light L2. The light combination means 4 combines the reflection light L3 reflected from the measurement target S when the measurement target S is irradiated with the measurement light L1 that has been obtained by dividing the light by the light division means 3 and the reference light L2. The interference light detection means 70 detects interference light L4 between the reflection light L3 and the reference light L2 that have been combined by the light combination means 4. Further, the interferometer 20 and the light source unit 30 are connected to each other by an APC (Angled Physical Contact) connector. Since the APC connector is used, it is possible to minimize the reflection light returning from the connection end surface of the optical connector (optical fiber), thereby preventing deterioration in the image quality of a tomographic image P.

The light division means 3 is formed, for example, by a 2×2 optical fiber coupler. The light division means 3 divides the light that has been output from the light source unit 30 and transmitted through the optical fiber FB1b into the measurement light L1 and the reference light L2. At this time, the light division means 3 divides the light, for example, at the ratio of measurement light L1: reference light L2=99:1. The light division means 3 is optically connected to the two optical fibers FB2 and FB3. The measurement light L1, which has been obtained by division, is input to the optical fiber FB2, and the reference light L2 is input to the optical fiber FB3.

The optical fiber FB2 is connected to an optical circulator 21. Further, the optical circulator 21 is connected to optical fibers FB4 and FB5. The optical fiber FB4 is connected to the optical probe 10, which directs the measurement light L1 to the measurement target S. The measurement light L1 output from the light division means 3 is transmitted from the optical fiber FB2 to the optical probe 10. Accordingly, the measurement target S is irradiated with the measurement light L1. Further, the reflection light L3 that has been reflected from the measurement target S is transmitted through the optical fiber FB4 and enters the optical circulator 21. Further, the reflection light L3 is output from the optical circulator 21 to the optical fiber FB5. Further, the optical fiber FB4 and the optical probe 10 are connected to each other by an APC (Angled Physical Contact) connector. Therefore, it is possible to minimize the reflection light returning from the connection end surface of the optical connector (optical fiber), thereby preventing deterioration in the image quality of a tomographic image P.

Meanwhile, the optical fiber FB3 is connected to an optical circulator 22. Further, the optical circulator 22 is connected to the optical fibers FB6 and FB7. The optical fiber FB6 is connected to an optical path length adjustment means 40 for changing the optical path length of the reference light L2 to adjust a region in which a tomographic image is obtained. The optical path length adjustment means 40 includes an optical fiber 40A for roughly adjusting an optical path length and an optical path length fine adjustment means 40B for finely adjusting the optical path length.

One of the ends of the optical fiber 40A for roughly adjusting the optical path length is detachably connected to the optical fiber FB6, and the other end of the optical fiber 40A for roughly adjusting the optical path length is detachably connected to the optical path length fine adjustment means 40B. As the optical fiber 40A for roughly adjusting the optical path length, a plurality of optical fibers that have different lengths from each other may be prepared in advance. Then, the optical fiber 40A for roughly adjusting the optical path length that has an appropriate length may be selected from the plurality of optical fibers and attached to be used. The optical fiber 40A for roughly adjusting the optical path length is connected to the optical fiber FB6 and the optical path length fine adjustment means 40B by APC (Angled Physical Contact) connectors, respectively. Therefore, it is possible to minimize the reflection light returning from the connection end surface of the optical connector (optical fiber), thereby preventing deterioration in the image quality of a tomographic image P.

The optical path length fine adjustment means 40B includes a reflection mirror 43, an optical terminator 44 and the like. The reflection mirror 43 reflects the reference light L2 output from the optical fiber 40A for roughly adjusting the optical path length toward the optical terminator 44. Further, the reflection mirror 43 reflects the reference light L2 reflected from the optical terminator 44 toward the optical fiber 40A for roughly adjusting the optical path length again. The reflection mirror 43 is fixed onto a movable stage (not illustrated). The reflection mirror 43 is moved by a mirror movement means in the direction (the direction of arrow A) of the optical path of the reference light L2. Accordingly, the optical path length of the reference light L2 is changed. When an optical path length adjustment operation unit 46 is operated by a physician or the like, the movable stage moves the reflection mirror 43 in the direction of arrow A.

Further, a polarization controller 50 is optically connected to the optical fiber FB7. The polarization controller 50 has a function for rotating the polarization direction of the reference light L2. As the polarization controller 50, a known technique, for example, disclosed in Japanese Unexamined Patent Publication No. 2001-264246 may be used. When a polarization adjustment operation unit 51 is operated by a physician or the like, the polarization controller 50 adjusts the polarization direction. For example, if the polarization adjustment operation unit 51 is operated so that the polarization direction of the reflection light L3 and that of the reference light L2 become the same when the reflection light L3 and the reference light L2 are combined by the light combination means 4, it is possible to obtain a sharp tomographic image.

The light combination means 4 is formed, for example, by a 2×2 optical fiber coupler. The light combination means 4 combines the reflection light L3 transmitted through the optical fiber FB5 and the reference light L2 transmitted through the optical fiber FB7. Specifically, the light combination means 4 splits the reflection light L3 transmitted through the optical fiber FB5 and causes the divided rays of light to enter two optical fibers, namely optical fibers FB8 and FB9, respectively. Further, the light combination means 4 splits the reference light L2 transmitted through the optical fiber FB7 and causes the divided rays of light to enter the optical fibers FB8 and FB9, respectively. Therefore, the reflection light L3 and the reference light L2 are combined with each other in each of the optical fibers FB8 and FB9. Hence, first interference light (interference light) L4a is transmitted through the optical fiber FB8, and second interference light (interference light) L4b is transmitted through the optical fiber FB9. Specifically, the light combination means 4 also functions as an optical splitting means 5 that splits the interference light L4 of the reflection light L3 and the reference light L2 into two rays of light, namely the interference light L4a and the interference light L4b.

The interference light detection means 70 includes a first photodetector 71, a second photodetector 72 and a differential amplifier 73. The first photodetector 71 detects the first interference light L4a. The second photodetector 72 detects the second interference light L4b. The differential amplifier 73 outputs, as an interference signal IS, a difference between the first interference light L4a detected by the first photodetector 71 and the second interference light L4b detected by the second photodetector 72. The photodetectors 71 and 72 are made of photodiodes or the like, for example. The photodetectors 71 and 72 perform photoelectric conversion on the interference light L4a and L4b, which are input to the photodetectors 71 and 72 through the interference-light optical path length adjustment means 60A and 60B, respectively, and input the converted signals into the differential amplifier 73. The differential amplifier 73 amplifies the difference between the interference light L4a and the interference light L4b and outputs the amplified signal as the interference signal IS. As described above, balanced detection of the interference light L4a and the interference light L4b by use of the differential amplifier 73 is performed. Therefore, it is possible to amplify the interference signal IS and to output the amplified interference signal IS while same-phase optical noises, other than the interference signal IS, are removed. Consequently, the image quality of the tomographic image P is improved.

Figure 6:
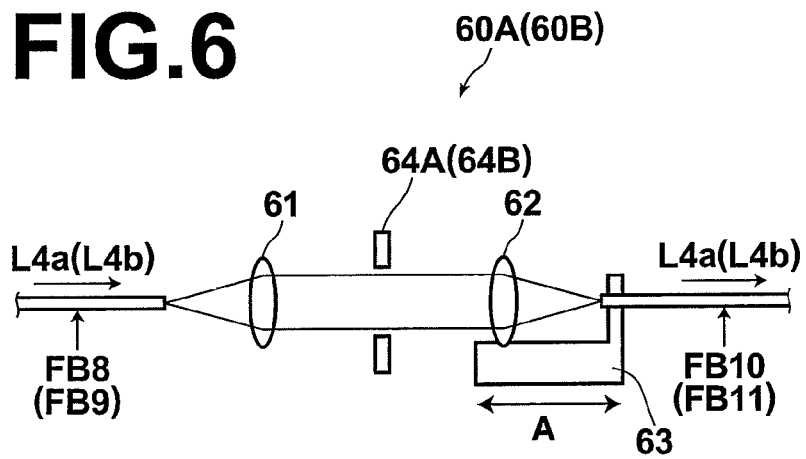
FIG. 6 is a schematic diagram illustrating an example of an interference-light optical path length adjustment means in the interferometer illustrated in FIG. 5.

Interference-light optical path length adjustment means 60A and 60B are provided between the light splitting means 5 (light combination means 4) and the interference light detection means 70. The interference-light optical path length adjustment means 60A and 60B adjust the optical path length of the first interference light L4a and that of the second interference light L4b, respectively. FIG. 6 is a schematic diagram illustrating an example of the interference-light optical path length adjustment means 60A and 60B. The structure of the interference-light optical path length adjustment means 60A and that of the interference-light optical path length adjustment means 60B are the same. Therefore, with reference to FIG. 6, the interference-light optical path length adjustment means 60A will be described.

The interference-light optical path length adjustment means 60A includes a collimator lens 61, a condensing lens 62 and a distance adjustment means 63. The collimator lens 61 collimates the first interference light L4a, which has been output from the light splitting means 5 and transmitted through the optical fiber FB8. The condensing lens 62 condenses the first interference light L4a that has been collimated by the collimator lens 61 to cause the first interference light L4a to enter an optical fiber FB10. The first interference light L4a that has entered the optical fiber FB10 enters the interference light detection means 70. The distance adjustment means 63 moves the condensing lens 62 and the optical fiber FB10 in a unified manner in the direction of the optical axis. Therefore, the distance of a section in which the first interference light L4a travels as collimated light can be changed. Accordingly, the optical path length of the first interference light L4a is changed. At this time, the optical path length is adjusted, based on the value of an output signal from the interference light detection means 70, so that the same-phase noise removal value (CMRR: Common-Mode Rejection Ratio) becomes a maximum value. The optical path length may be adjusted either manually or automatically.

Accordingly, when balanced detection is performed at the interference light detection means 70, the same-phase noise, which is a non-interference component, is removed in a maximum degree. Consequently, the S/N ratio is improved. Specifically, it is necessary that the optical path length of the first interference light L4a and that of the second interference light L4b are the same to improve the S/N ratio by performing balanced detection at the interference light detection means 70. Here, the first interference light L4a and the second interference light L4b are sent from the light splitting means 5 to the interference light detection means 70 through the optical fibers FB8 and FB10 and through the optical fiber FB9 and an optical fiber FB11, respectively. Therefore, if the length of the optical fibers FB8 and FB10 and the length of the optical fibers FB9 and FB11 are different from each other because of a manufacturing error or the like, a white noise component increases, thereby lowering the S/N ratio. In such a case, the aim of the balanced detection is not sufficiently achieved. Therefore, the aforementioned interference-light optical path length adjustment means 60A and 60B are provided. If the interference-light optical path length adjustment means 60A and 60B are provided, it is possible to make the optical path length of the first interference light L4a and that of the second interference light L4b the same. Accordingly, the S/N ratio can be improved by balanced detection.

Further, a light amount adjustment means 64A is arranged between the collimator lens 61 and the condensing lens 62. Meanwhile, a light amount adjustment means 64B is provided in the optical path of the second interference light L4b. The light amount adjustment means 64A is formed, for example, by a diaphragm that can adjust the attenuation amount of the light amount according to time. The light amount of the first interference light L4a attenuates at a different attenuation rate for each wavelength band, and the first interference light L4a, the light amount of which has been adjusted, is output to the interference light detection means 70 side. The light amount adjustment means 64A adjusts the light amount of the first interference light L4a so that the light amount of the first interference light L4a and that of the second interference light L4b become balanced with each other, thereby compensating the variance in the optical characteristics of the interference-light optical path length adjustment means 60A and 60B. Further, when the interference light L4a and L4b, the wavelengths of which change as time passes, enter the light amount adjustment means 64A and 64B, respectively, the light amount adjustment means 64A and 64B attenuate the interference light L4a and L4b, respectively, using different attenuation rates based on the change in the wavelengths.

Figure 7:
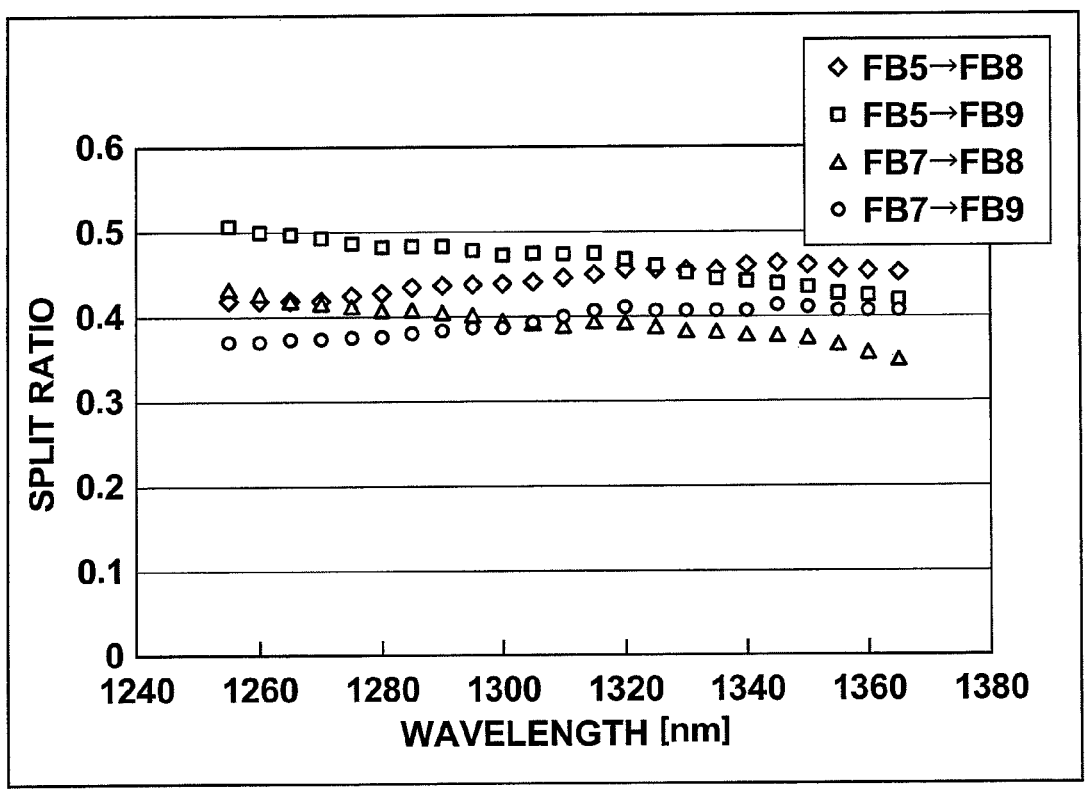
FIG. 7 is a graph showing an example of the wavelength-split ratio characteristic of a light splitting means illustrated in FIG. 5.

Accordingly, when the first interference light L4a and the second interference light L4b are detected at the light detection units 71 and 72, respectively, each of the light intensity detection signal level of the first interference light L4a detected by the light detection unit 71 and that of the second interference light L4b detected by the light detection unit 72 become substantially equal in the entire wavelength range. Therefore, when balanced detection is performed by the interference light detection means 70, it is possible to improve the S/N ratio. Specifically, the first interference light L4a and the second interference light L4b are obtained by splitting interference light at the light splitting means 5, such as an optical fiber coupler or a beam splitter. The optical fiber coupler and the like have wavelength-dependent characteristics as illustrated in FIG. 7. Therefore, the split ratio is not always 50:50 in the entire wavelength range of the interference light L4 (the swept wavelength band of the laser light L). Specifically, there are cases in which the interference light is split into the first interference light L4a and the second interference light L4b at different split ratios depending on the wavelength bands.

Figure 8:
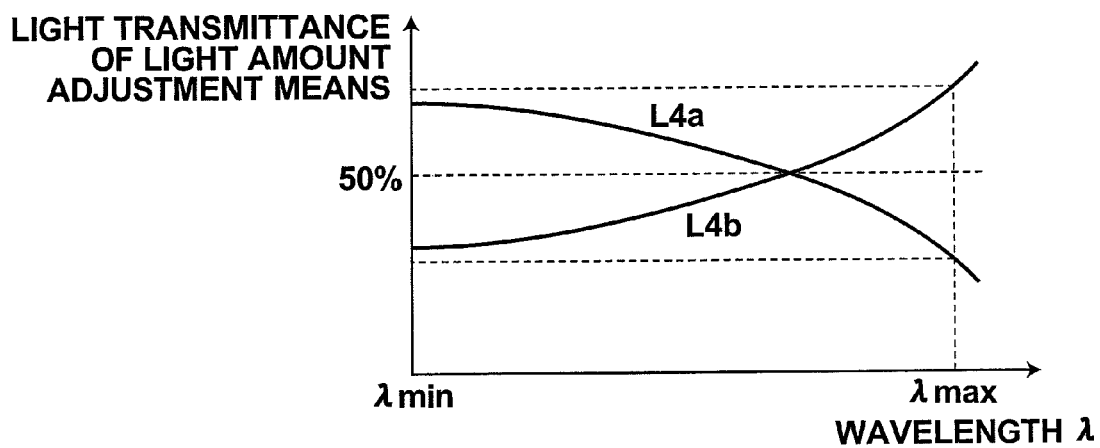
FIG. 8 is a graph showing an example of the wavelength-attenuation characteristic of a light amount adjustment means illustrated in FIG. 6.

Meanwhile, it is necessary that the light amount of the first interference light L4a and that of the second interference light L4b are substantially equal to each other to improve the S/N ratio by balanced detection at the interference light detection means 70. If the light amount of the first interference light L4a and that of the second interference light L4b are different from each other, a white noise component increases, and the S/N ratio drops. Consequently, it becomes impossible to sufficiently achieve the aim of the balanced detection. Therefore, the light amount adjustment means 64A and 64B are inserted between the light splitting means 5 and the interference light detection means 70. The light amount adjustment means 64A and 64B adjust the light amounts at different attenuation ratios depending on the wavelengths of the interference light L4a and L4b, as illustrated in FIG. 8.

Here, when the light amount of the first interference light L4a and that of the second interference light L4b for each wavelength band when light is split into the first interference light L4a and the second interference light L4b by the light splitting means 5 are $Pa(\lambda)$ and $Pb(\lambda)$, respectively, and the transmittance of the first interference light L4a by the light amount adjustment means 64A and that of the second interference light L4b by the light amount adjustment means 64B for each wavelength band are $Ta(\lambda)$ and $Tb(\lambda)$, respectively, the attenuation rate (transmittance) of each of the light amount adjustment means 64A and 64B is set so as to satisfy the following equation:

$$Pa(\lambda) \cdot Ta(\lambda) = Pb(\lambda) \cdot Tb(\lambda).$$

Accordingly, the light amount of the interference light L4a and that of the interference light L4b, the interference light L4a and the interference light L4b having been obtained by splitting light, become substantially equal to each other in the entire wavelength band. Consequently, it becomes possible to remove the white noise component by balanced detection at the interference light detection means 70, thereby improving the S/N ratio.

An interference signal IS output from the interference light detection means 70 is amplified by an amplifier 74. Further, the amplified interference signal IS is output to an A/D conversion unit 90 through a signal band filter 75. Since the signal band filter 75 is provided, it is possible to remove noise from the interference signal IS, thereby improving the S/N ratio.

Figure 9:
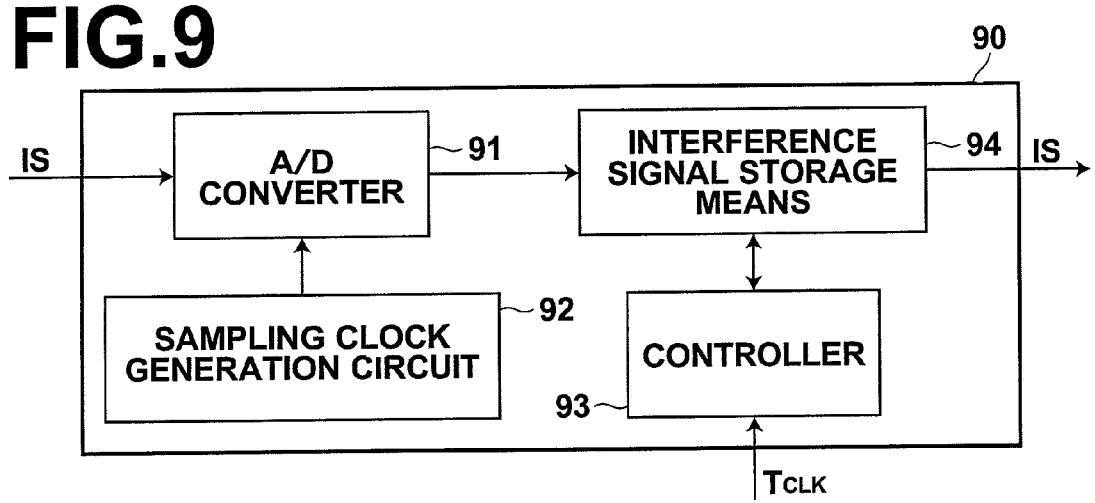
FIG. 9 is a block diagram illustrating an example of an A/D conversion unit in the system for producing tomographic images by optical tomography illustrated in FIG. 1.

FIG. 9 is a block diagram illustrating an example of the A/D conversion unit 90 illustrated in FIG. 1. The A/D conversion unit 90 converts the interference signal IS detected by the interference light detection means 70 into a digital signal, and outputs the digital signal. The A/D conversion unit 90 includes an A/D converter 91, a sampling clock generation circuit 92, a controller 93, and an interference signal storage means 94. The A/D converter 91 converts the interference signal Is that is output, as an analog signal, from the interferometer 20 into a digital signal. The A/D converter 91 performs A/D conversion on the interference signal IS based on a sampling clock output from the sampling clock generation circuit 92. The interference signal storage means 94 is, for example, a RAM (random-access memory) or the like, and stores the digitized interference signal IS. The operations of the A/D converter 91, the sampling clock generation circuit 92 and the interference signal storage means 94 are controlled by the controller 93.

Here, the interference signal IS stored in the interference signal storage means 94 is obtained by an interference signal obtainment means 101 when a periodic clock signal $T_{CLK}$ is output. The interference signal obtainment means 101 obtains the interference signals IS only for one period based on the output timing of the periodic clock signal $T_{CLK}$. Specifically, the interference signal obtainment means 101 obtains the interference signal IS at the same timing as the output timing of the periodic clock signal $T_{CLK}$, for example.

Figure 10:
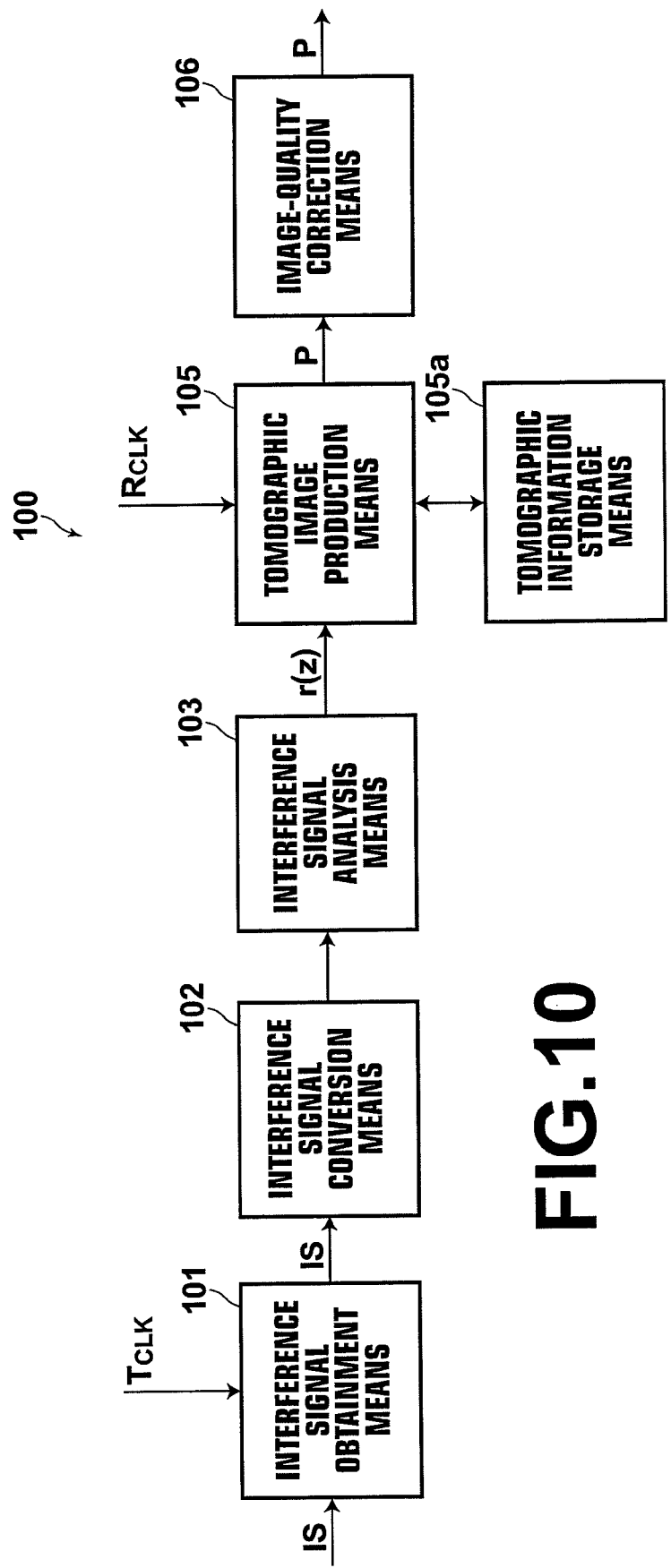
FIG. 10 is a block diagram illustrating an example of a tomographic image processing means illustrated in FIG. 1.

FIG. 10 is a block diagram illustrating an example of the tomographic image processing means 100. The configuration of the tomographic image processing means 100, as illustrated in FIG. 10, is realized by causing a computer (for example, a personal computer) to execute a tomographic image processing program installed in a supplementary storage apparatus. The tomographic image processing means 100 includes an interference signal obtainment means 101, an interference signal conversion means 102, an interference signal analysis means 103, a tomographic image production means 105 and the like.

The interference signal obtainment means 101 obtains the interference signal IS, detected by the interference light detection means 70, for one period based on the periodic clock signal $T_{CLK}$ output from the periodic clock generation means 80. The interference signal obtainment means 101 obtains the interference signal IS from the interference signal storage means 94.

Figure 11:
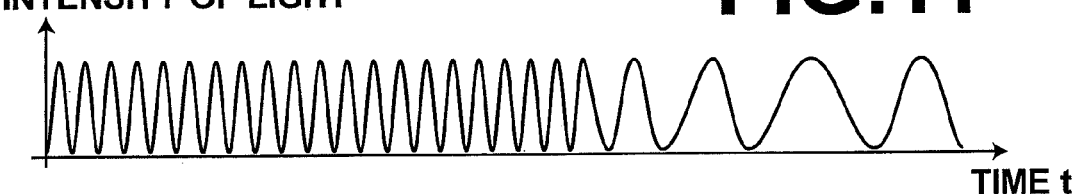
FIG. 11 is a graph showing an example of interference signals that are input to the interference signal conversion means illustrated in FIG. 9.
Figure 12:
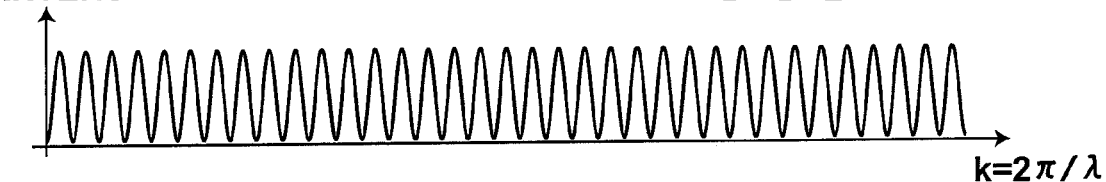
FIG. 12 is a graph showing an example of interference signals that have been re-sampled by the interference signal conversion means illustrated in FIG. 10.

The interference signal conversion means 102 has a function for rearranging the interference signals IS, as illustrated in FIG. 11, which are obtained at the A/D conversion unit 90 as time passes. The interference signals IS are rearranged at regular intervals with respect to the axis of the number k of waves (=2π/λ), as illustrated in FIG. 12. Specifically, the interference signal conversion means 102 has a time-wavelength sweep characteristic data table or function about the light source unit 30 in advance. Therefore, the interference signal conversion means 102 rearranges the interference signals IS, based on the time-wavelength sweep characteristic data table or the like, in such a manner that the signals are arranged at regular intervals with respect to the axis of the number k of waves. Accordingly, when tomographic information is calculated from the interference signals IS, a spectral analysis method, such as the Fourier transformation method or the maximum entropy method, can be used and highly accurate tomographic information can be obtained. In these spectral analysis methods, it is necessary that the signals to be processed are arranged at regular intervals in the frequency space. The detail of this signal conversion technique is disclosed in the specification of U.S. Pat. No. 5,956,355. As described above, the interference signal conversion means 102 performs the conversion processing based on the time-wavelength sweep characteristic data table or the like that is kept in advance. Therefore, it is possible to improve the efficiency of the signal conversion processing.

The interference signal analysis means 103 analyzes the interference signals IS after the signal conversion by the interference signal conversion means 102, for example, by using a known spectral analysis technique, such as the Fourier transformation, the maximum entropy method (MEM), and the Yule-Walker method. Consequently, the interference signal analysis means 103 obtains tomographic information r(z).

Figure 13:
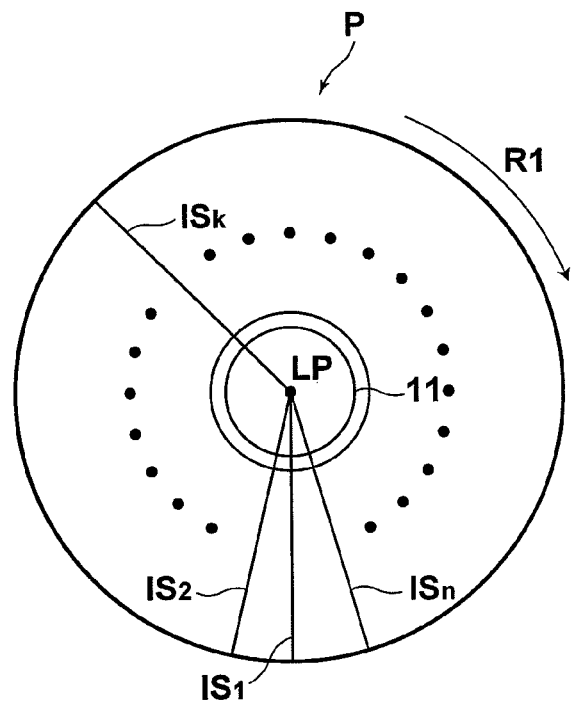
FIG. 13 is a schematic diagram illustrating an example of a tomographic image produced by a tomographic image production means illustrated in FIG. 10.

The tomographic image production means 105 obtains the tomographic information r(z) for one period (for one line) obtained by the interference signal analysis means 103. The tomographic information r(z) is obtained with respect to the radial direction (the direction of arrow R1) of the optical probe 10. Consequently, one tomographic image P, as illustrated in FIG. 13, is produced. Here, the tomographic image production means 105 stores the tomographic information r(z) for one line that is sequentially obtained in a tomographic information storage means 105a. When a rotation clock signal $R_{CLK}$ is output from the rotation control means 10B illustrated in FIG. 1, the tomographic image production means 105 produces a tomographic image P based on the stored tomographic information r(z) form lines, as illustrated in FIG. 13. For example, when the periodic clock signal $T_{CLK}$ from the light source unit 30 is 20 kHz, and the optical probe 10 scans the measurement target with the measurement light L1 in the direction of arrow R1 at 20 Hz, the tomographic image production means 105 produces one tomographic image P based on the tomographic information r(z) for 1024 lines (n=1024 lines).

Further, a method for obtaining and averaging a plurality of tomographic images may be used to improve the image quality. Specifically, the optical probe 10 irradiates the measurement target S with the measurement light L1 so that the same region of the measurement target S is scanned a plurality of times, and a plurality of tomographic images are obtained for the same region of the measurement target S. Further, the tomographic image production means 105 uses the plurality of tomographic images, and calculates an average value of tomographic information r(x, z) about each depth position z at position x with respect to the longitudinal direction of the optical probe 10. Accordingly, a noise component that is contained in each of the tomographic images is cancelled, and a high image quality tomographic image can be obtained.

Further, when the tomographic image production means 105 produces a tomographic image using tomographic information r(z) for a plurality of lines with respect to the scan direction (the direction of arrow R1), the tomographic image may be produced by using an average obtained by averaging tomographic information for a plurality lines that are adjacent to each other. For example, the tomographic image production means 105 uses, as tomographic information that is used to produce a tomographic image, an average value of tomographic information for three lines that are adjacent to each other. Accordingly, the noise component that is included in the tomographic information for each line is cancelled, and a high image quality tomographic image can be produced.

An image quality correction means 106 corrects the image quality of the tomographic image P produced by the tomographic image production means 105 by performing sharpness processing, smoothing processing or the like. After the image quality of the tomographic image P is corrected, the tomographic image P is displayed on the display device 110 illustrated in FIG. 1.

Next, with reference to FIGS. 1 through 13, an example of the operation of the system for producing a tomographic image by optical tomography will be described. First, the light source unit 30 outputs a beam (light L), the wavelength of which is periodically swept in a predetermined wavelength band. The light L is divided into two by the light splitting means 2. The divided rays of light enter the interferometer 20 and the periodic clock generation means 80, respectively. Further, the light division means 3 in the interferometer 20 divides the light L into measurement light L1 and reference light L2. The measurement light L1 is output to the optical fiber FB2 and the reference light L2 is output to the optical fiber FB3.

The measurement light L1 is guided through the optical circulator 21, the optical fiber FB4 and the optical probe 10, and irradiates the measurement target S. Then, reflection light L3 reflected from the measurement target S at each depth position z of the measurement target S and backscattered light reenter the optical probe 10. The reflection light L3 is transmitted through the optical probe 10, the optical fiber FB4, the optical circulator 21 and the optical fiber FB5, and enters the light combination means 4.

Meanwhile, the reference light L2 is transmitted through the optical fiber FB3, the optical circulator 22 and the optical fiber FB6, and enters the optical path length adjustment means 40. The optical path length of the reference light L2 is adjusted by the optical path length adjustment means 40, and the reference light L2 is transmitted through the optical fiber FB6, the optical circulator 22, the polarization controller 50 and the optical fiber FB7 and enters the light combination means 4.

The light combination means 4 combines the reflection light L3 and the reference light L2. Further, the light combination means 4 (light splitting means 5) splits the combined interference light L4 into interference light L4a and interference light L4b. The interference light L4a and the interference light L4b are output to the optical fibers FB8 and FB9, respectively. Further, the interference light L4a and L4b is guided by the optical fibers FB8 and FB9, respectively, and adjusted by the optical path length adjustment means 60A and 60B, respectively, so that optical path lengths become the same. Further, the light amounts of the interference light L4a and L4b are adjusted by the light amount adjustment means 64A and 64B, respectively. Further, balanced detection is performed by the interference light detection means 70.

As described above, before the balanced detection is performed by the interference light detection means 70, the interference-light optical path length adjustment means 60A and 60B adjust the optical path lengths of the first interference light L4a and the second interference light L4b, respectively, so that the optical path lengths become the same. Further, before the balanced detection is performed by the interference light detection means 70, the light amount adjustment means 64A and 64B adjust the light amounts of the interference light L4a and L4b, respectively. Therefore, it is possible to accurately remove the non-interference component by performing balanced detection at the interference light detection means 70, and to improve the S/N ratio.

The interference light L4 detected by the interference light detection means 70 by the balanced detection is output as an interference signal IS. The interference signal IS is sent through the amplifier 74 and the signal band filter 75, and output to the A/D conversion unit 90. After then, A/D conversion is performed on the interference signal IS at the A/D conversion unit 90, and data for one period (one line) of the light source unit 30 is stored in the interference signal storage means 94.

Meanwhile, light L output from the light source unit 30 is transmitted through the light splitting means 2 and enters the periodic clock generation means 80. The periodic clock generation means 80 outputs a periodic clock signal $T_{CLK}$ to the interference signal obtainment means 101 at every wavelength sweep, and interference signals IS for one period are obtained from the interference signals IS stored in the interference signal storage means 94.

In the tomographic image processing means 100, the interference signal conversion means 102 performs signal conversion processing on interference signals IS for one line so that the interference signals are arranged at regular intervals with respect to the number k of waves. After then, the interference signal analysis means 103 performs spectral analysis on the interference signals IS. Accordingly, tomographic information (reflectance) is obtained as tomographic information r(z). The tomographic image production means 105 stores the obtained tomographic information r(z) for n lines with respect to the scan direction (the direction of arrow R1) of the measurement light L1. Then, when a rotation clock signal $R_{CLK}$ is detected, one tomographic image P is produced based on a plurality of pieces of tomographic information r(z) that have been stored. After then, the image quality correction means 106 performs image quality correction on the produced tomographic image P, and the tomographic image P after the image quality correction is displayed on the display device 110 illustrated in FIG. 1.

According to the aforementioned embodiments, when an interference signal IS is generated using a difference between the first interference light L4a and the second interference light L4b, which are obtained by splitting light, the optical path lengths of the first interference light L4a and the second interference light L4b are adjusted so that they become the same. Accordingly, when balanced detection is performed by the interference light detection means 70, it is possible to improve the S/N ratio.

Further, in FIG. 6, the light amount adjustment means 64A and 64B that adjust, at a different attenuation ratio for each wavelength band, the light amount of the first interference light L4a and that of the second interference light L4b, respectively, are further provided. The light amount of the first interference light L4a and that of the second interference light L4b, the first interference light L4a and the second interference light L4b having been obtained by splitting light at the light splitting means 5, are adjusted so that they become substantially equal to each other. When the light amount adjustment means 64A and 64B are further provided, even if the light amount changes because of a variance in the optical characteristics between the interference-light optical path length adjustment means 60A and 60B, or even if the light splitting means 5 cannot split the interference light equally (evenly) across the entire wavelength band because of the wavelength-dependent characteristic of the light splitting means 5, the light amount adjustment means 64A and 64B can adjust the light amount of the first interference light L4a and that of the second interference light L4b, respectively, in such a manner that the light amount of the first interference light L4a and that of the second interference light L4b are substantially equal to each other in each wavelength band. Therefore, it is possible to further improve the S/N ratio.

The embodiments of the present invention are not limited to the aforementioned embodiments. In FIG. 1, the system 1 for producing tomographic images by optical tomography in which a tomographic image P is obtained by so-called SS-OCT measurement is illustrated as an example. Further, the interference-light optical path length adjustment means 60A and 60B may be adopted when balanced detection is performed in SD-OCT measurement and TD-OCT measurement.

Further, in FIG. 6, a case in which the interference-light optical path length adjustment means 60A and 60B are provided for both of the first interference light L4a and the second interference light L4b is illustrated, as an example. However, only one of the interference-light optical path length adjustment means 60A and 60B may be provided. In that case, the optical path length of one of the first interference light L4a and the second interference light L4b is adjusted based on the optical path length of the other one.

Further, in FIG. 6, a case in which the light amount adjustment means 64A and 64B are formed by diaphragms is illustrated as an example. Alternatively, the light amount adjustment means 64A and 64B may be structured in such a manner that the attenuation rate can be changed for each wavelength band by using a known technique, such as a variable light attenuator.

Further, in FIG. 6, a case in which the interference-light optical path length adjustment means changes the optical path length by moving the condensing lens 62 is illustrated, as an example. Alternatively, the optical path length may be changed by moving the collimator lens 61 and the optical fiber side. Further, in FIG. 6, a case in which the optical path length is adjusted by changing the distance of the section in which the light travels as collimated light is illustrated as an example. For example, a known optical path length adjustment technique, such as a method of inserting a wedge-shaped optical member into the optical path, may be adopted.

What is claimed is:

1. A system for producing a tomographic image by optical tomography, the system comprising:
   a light source unit that outputs light;
   a light division means that divides the light, which has been output from the light source unit, into measurement light and reference light;
   a light combination means that combines reflection light that is reflected from a measurement target when the measurement target is irradiated with the measurement light, which has been obtained by dividing the light by the light division means, and the reference light;

a light splitting means that splits interference light obtained by combining the reflection light and the reference light at the light combination means into first interference light and second interference light;

an interference-light optical path length adjustment means that adjusts the optical path length of at least one of the first interference light and the second interference light, which have been obtained by splitting the interference light at the light splitting means, so that the optical path length of the first interference light and that of the second interference light become the same;

an interference light detection means that detects, as an interference signal, a difference between the first interference light and the second interference light, the optical path length of at least one of which has been adjusted at the interference-light optical path length adjustment means; and a tomographic image processing means that produces the tomographic image based on the interference signal detected by the interference light detection means.

2. A system for producing a tomographic image by optical tomography, as defined in claim 1, wherein the interference-light optical path length adjustment means includes a collimator lens, a light condensing means and a distance adjustment means, wherein the collimator lens collimates the first interference light and/or the second interference light output from the light splitting means, and wherein the light condensing means condenses the first interference light and/or the second interference light, which have been collimated by the collimator lens, to cause the condensed light to enter an optical fiber for outputting the first interference light and/or the second interference light to the interference light detection means, and wherein the distance adjustment means adjusts a distance between the light condensing means and the collimator lens, between which the first interference light and/or the second interference light travels as collimated light.

3. A system for producing a tomographic image by optical tomography, as defined in claim 1, the system further comprising:

a light amount adjustment means that adjusts the first interference light and the second interference light, which have been obtained by splitting the interference light at the light splitting means, at a different attenuation rate for each wavelength band so that the light amount of the first interference light and that of the second interference light become substantially equal to each other.

4. A system for producing a tomographic image by optical tomography, as defined in claim 2, the system further comprising:

a light amount adjustment means that adjusts the first interference light and the second interference light, which have been obtained by splitting the interference light at the light splitting means, at a different attenuation rate for each wavelength band so that the light amount of the first interference light and that of the second interference light become substantially equal to each other.

* * * * *